(12) United States Patent
Shen et al.

(10) Patent No.: US 11,940,187 B2
(45) Date of Patent: Mar. 26, 2024

(54) WATER TREATMENT SYSTEM OF COUPLING HEAT PUMP WITH MULTI-EFFECT EVAPORATION AND OPERATING METHOD THEREOF

(71) Applicant: JIANGSU UNIVERSITY OF SCIENCE AND TECHNOLOGY, Jiangsu (CN)

(72) Inventors: Jiubing Shen, Jiangsu (CN); Lele Jiang, Jiangsu (CN); Wenbin Wei, Jiangsu (CN); Yang Chen, Jiangsu (CN)

(73) Assignee: JIANGSU UNIVERSITY OF SCIENCE AND TECHNOLOGY, Jiangsu (CN)

( * ) Notice: Subject to any disclaimer, the term of this patent is extended or adjusted under 35 U.S.C. 154(b) by 0 days.

(21) Appl. No.: 18/034,067

(22) PCT Filed: Nov. 11, 2022

(86) PCT No.: PCT/CN2022/131371
§ 371 (c)(1),
(2) Date: Apr. 27, 2023

(87) PCT Pub. No.: WO2023/083300
PCT Pub. Date: May 19, 2023

(65) Prior Publication Data
US 2023/0400234 A1    Dec. 14, 2023

(30) Foreign Application Priority Data
Nov. 15, 2021    (CN) .......................... 202111347433.0

(51) Int. Cl.
*F25B 25/02*    (2006.01)
*B01D 1/00*    (2006.01)
(Continued)

(52) U.S. Cl.
CPC ............ *F25B 25/02* (2013.01); *B01D 1/0082* (2013.01); *B01D 1/26* (2013.01); *B01D 3/007* (2013.01);
(Continued)

(58) Field of Classification Search
CPC ........ B01D 1/0082; B01D 1/26; B01D 5/006; C02F 1/043; C02F 1/048; F25B 25/02; F25B 41/24; F25B 41/325
See application file for complete search history.

(56) References Cited

U.S. PATENT DOCUMENTS 9,464,826 B2 * 10/2016 Tsai .......................... F25B 25/02
10,399,003 B2 * 9/2019 Antar ..................... B01D 1/305
(Continued)

FOREIGN PATENT DOCUMENTS

CN    101491738    7/2009
CN    103265089    8/2013
(Continued)

OTHER PUBLICATIONS

"International Search Report (Form PCT/ISA/210) of PCT/CN2022/131371," dated Dec. 19, 2022, pp. 1-4.

*Primary Examiner* — Jonathan Miller
(74) *Attorney, Agent, or Firm* — JCIPRNET

(57) ABSTRACT

A water treatment system of coupling a heat pump with multi-effect evaporation that comprises a lithium bromide absorption-type heat pump circulation system, a multi-effect evaporation circulation system and a compression-type heat pump circulation system is provided. The vapor in a tail-end evaporator of the multi-effect evaporation circulation system is introduced into a generator in the absorption-type heat pump to release heat and condense. A dilute solution in an absorber of the absorption-type heat pump is introduced into a first-effect evaporator to be evaporated by a treated water, (Continued)

and a condensation heat of the vapor generated by the generator of the absorption-type heat pump is recovered by an evaporator of a compressor heat pump, and another air source evaporator absorbs heat from ambient air to supply heat for the generator by a heat pump condenser.

9 Claims, 1 Drawing Sheet

(51) Int. Cl.
*B01D 1/26* (2006.01)
*B01D 3/00* (2006.01)
*B01D 5/00* (2006.01)
*C02F 1/04* (2023.01)
*F25B 41/24* (2021.01)
*F25B 41/325* (2021.01)

(52) U.S. Cl.
CPC .............. *B01D 5/006* (2013.01); *C02F 1/043* (2013.01); *C02F 1/048* (2013.01); *F25B 41/24* (2021.01); *F25B 41/325* (2021.01); *C02F 2201/005* (2013.01); *C02F 2303/10* (2013.01); *F25B 2600/2513* (2013.01)

(56) References Cited

U.S. PATENT DOCUMENTS

| | | | |
|---|---|---|---|
| 10,471,367 B1* | 11/2019 | Antar | B01D 1/04 |
| 10,532,936 B2* | 1/2020 | Al-Azazmeh | B01D 5/006 |
| 10,569,188 B2* | 2/2020 | Lehmann | C02F 1/041 |
| 10,612,821 B1* | 4/2020 | Fernando | F25B 1/10 |
| 11,142,468 B2* | 10/2021 | Qasem | B01D 5/0051 |
| 11,221,161 B1* | 1/2022 | Fernando | F25B 25/02 |
| 11,353,242 B2* | 6/2022 | Shen | F24H 9/1809 |
| 11,761,644 B1* | 9/2023 | Qasem | F24F 3/1411 |
| | | | 62/92 |
| 2014/0013783 A1 | 1/2014 | Xiang et al. | |
| 2015/0013373 A1* | 1/2015 | Tsai | F25B 40/02 |
| | | | 62/333 |
| 2018/0172320 A1* | 6/2018 | Zhou | F25B 49/04 |
| 2022/0042717 A1* | 2/2022 | Shen | F25B 41/22 |
| 2022/0358268 A1* | 11/2022 | Wang | G06Q 10/04 |

FOREIGN PATENT DOCUMENTS

| | | |
|---|---|---|
| CN | 205307834 | 6/2016 |
| CN | 107490210 | 12/2017 |
| CN | 109612158 | 4/2019 |
| CN | 109612159 | 4/2019 |
| CN | 113932474 | 1/2022 |

\* cited by examiner

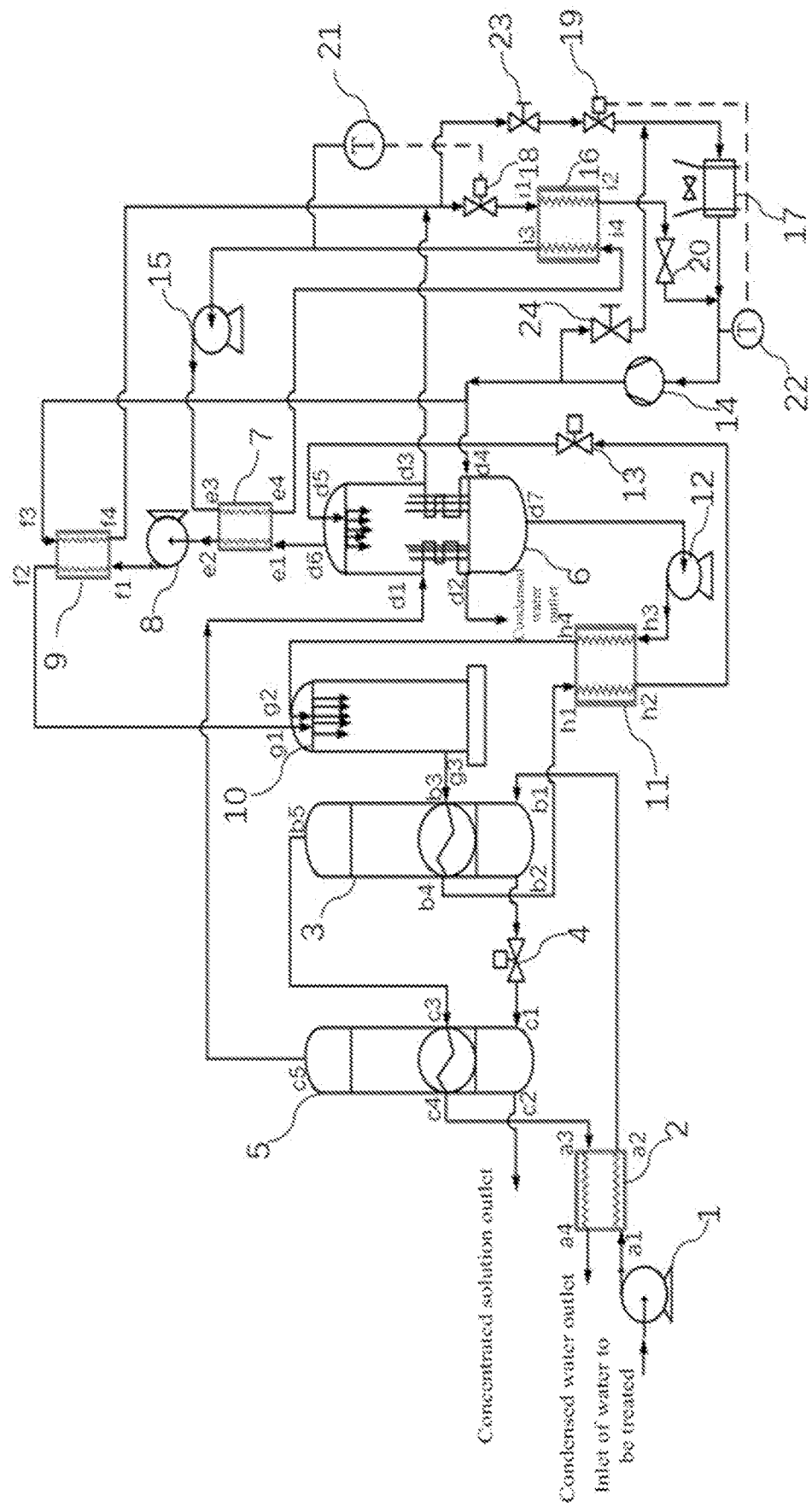

US 11,940,187 B2

WATER TREATMENT SYSTEM OF COUPLING HEAT PUMP WITH MULTI-EFFECT EVAPORATION AND OPERATING METHOD THEREOF

CROSS-REFERENCE TO RELATED APPLICATION

This application is a 371 of international application of PCT application serial no. PCT/CN2022/131371, filed on Nov. 11, 2022, which claims the priority benefit of China application no. 202111347433.0, filed on Nov. 15, 2021. The entirety of each of the above-mentioned patent applications is hereby incorporated by reference herein and made a part of this specification.

TECHNICAL FIELD

The present disclosure relates to the field of industrial water treatment and heat recovery, in particular to a water treatment system of coupling heat pump heat recovery with multi-effect evaporation and an operating method thereof.

DESCRIPTION OF RELATED ART

In the chemical, petroleum, pharmaceutical and other industries, most of them use evaporation technology to evaporate, concentrate, crystallize, dry, and sterilize. However, the evaporation technology is a unit operation with high energy consumption, which has always been a giant energy consumer of chemical production process or wastewater treatment. The evaporation process is mainly used to recover the high-concentration concentrated wastewater solution. In simple terms, evaporation and concentration refers to the process of heating the solution to volatilize part of the water and increase the solute concentration. In the process of evaporation and concentration, it is necessary to continuously supply heat energy. In industry, the water vapor is usually adopted as the heat source, whereas, most of the evaporated and concentrated materials are aqueous solutions. During this operation, more secondary vapor will be generated. If the secondary vapor is directly discharged, it will not only waste the latent heat of the vapor, but also flow out of the evaporation system along with part of materials, which causes certain pollution to the environment.

The energy consumption and waste heat of the evaporation system are still serious in traditional industries. In the traditional concentration method of single-effect distillation, the secondary vapor cannot be reused, and most of them only recycle and recover approximately 30% of the waste heat and residual heat. Therefore, the recycling of waste heat and recovery of residual heat is one of the important links in energy conservation and emission reduction, and is also a necessary measure for enterprises to reduce costs, protect the environment and increase efficiency.

Mechanical vapor recompression is currently the most frequently used method for recovering the residual heat of the low-temperature secondary vapor. However, when the wastewater temperature is too low, the secondary vapor pressure and temperature are low, the vapor specific volume is large, and the flow and the pressure ratio of the compressor are large. Currently, the technology of vapor compressors with large flow rate and pressure ratio is still immature, the compressor failure rate is high, and the system stability is poor. Therefore, there is an urgent need for a method that can replace the mechanical vapor compressor and can be used to recover the heat of the secondary vapor of the multi-effect evaporation system to implement heat recovery and concentration treatment of wastewater. It is best to eliminate the dependence of the multi-effect evaporation system on heat source vapor.

SUMMARY

The objectives of the present disclosure are to provide a water treatment system of coupling a heat pump with multi-effect evaporation in view of the problems and deficiencies exist in the above-mentioned prior art.

In order to realize the objectives of the present disclosure, the technical solutions adopted in the present disclosure are as follows.

Provided is a water treatment system of coupling a heat pump with multi-effect evaporation. The system comprises a multi-effect evaporation circulation system, a lithium bromide absorption-type heat pump circulation system and a compression-type heat pump circulation system. The multi-effect evaporation circulation system includes a first centrifugal pump 1, a pre-heater 2, a first-effect evaporator 3, a first pressure reducing valve 4 and a second-effect evaporator 5. The water to be treated is connected to an inlet of the first centrifugal pump 1 through a pipeline. An outlet of the first centrifugal pump 1 is connected to an inlet a1 of the pre-heater 2 through a pipeline. An outlet a2 of the pre-heater 2 is connected to a solution inlet b1 of the first-effect evaporator 3 through a pipeline. A solution outlet b2 of the first-effect evaporator 3 is connected to a solution inlet c1 of the second-effect evaporator 5 through the first pressure reducing valve 4 and is discharged from a concentrated solution outlet c2. A vapor outlet b5 of the first-effect evaporator 3 is connected to a vapor inlet c3 of the second-effect evaporator 5 through a pipeline. A condensed water outlet c4 of the second-effect evaporator 5 is connected to a condensed water inlet a3 of the pre-heater 2 through a pipeline and is discharged from an outlet a4.

The lithium bromide absorption-type heat pump circulation system includes a generator 6, a condenser 7, a second centrifugal pump 8, a first evaporator 9, an absorber 10, a solution heat exchanger 11, a third centrifugal pump 12 and a second pressure reducing valve 13. A vapor inlet d1 of the generator 6 is connected to a vapor outlet c5 of the second-effect evaporator through a pipeline. Condensed water of the generator 6 is discharged from an outlet d2. An upper vapor outlet d6 of the generator 6 is connected to a vapor inlet e1 of the condenser 7. An outlet e2 of the condenser 7 is connected to a water inlet f1 of the first evaporator 9 through pipelines via the second centrifugal pump 8. A vapor outlet f2 of the first evaporator 9 is connected to a top vapor inlet g1 of the absorber 10. A bottom concentrated solution outlet d7 of the generator 6 is connected to an inlet h3 of the solution heat exchanger 11 via the third centrifugal pump 12. An outlet h4 of the solution heat exchanger 11 is connected to a solution inlet g2 of the absorber 10. A solution inlet h1 of the solution heat exchanger 11 is connected to a solution outlet b4 of the first-effect evaporator 3 through a pipeline. A solution outlet h2 of the solution heat exchanger 11 is connected to a solution inlet d5 of the generator 6 via the second pressure reducing valve 13, and a dilute solution outlet g3 of the absorber 10 is connected to an inlet b3 of the first-effect evaporator 3.

The compression-type heat pump circulation system includes a compressor 14, a fourth centrifugal pump 15, a second evaporator 16, a third evaporator 17, a first throttle valve 18, a second throttle valve 19 and an evaporation pressure regulating valve 20. An outlet of the compressor 14 is connected to a refrigerant inlet d4 of the generator 6 and a refrigerant inlet f3 of the first evaporator 9 respectively. A refrigerant outlet d3 of the generator 6 and a refrigerant outlet f4 of the first evaporator 9 are converged by pipelines, then connected to an inlet of a first cut-off valve 23 and an inlet of the first throttle valve 18 respectively. An outlet of the first throttle valve 18 is connected to a solution inlet i1 of the second evaporator 16. A solution outlet i2 of the second evaporator 16 is connected to an inlet of the evaporation pressure regulating valve 20. An outlet of the first cut-off valve 23 is connected to an inlet of the second throttle valve 19 through a pipeline. An outlet of the second throttle valve 19 is connected to an inlet of the third evaporator 17. An outlet of the third evaporator 17 and an outlet of the evaporation pressure regulating valve 20 are jointly connected to the inlet of the compressor 14 through pipelines. An outlet of the fourth centrifugal pump 15 is connected to an inlet e3 of the condenser 7. An outlet e4 of the condenser 7 is connected to an inlet i4 of the second evaporator 16 and an outlet i3 of the second evaporator 16 is connected to an inlet of the fourth centrifugal pump 15.

Further, a first temperature controller 21 is disposed on a pipeline at the outlet i3 of the second evaporator 16. A control signal of the first temperature controller 21 is connected to the first throttle valve 18 through a wire. A second temperature controller 22 is disposed at the inlet of the compressor 14, and a control signal of the second temperature controller 22 is connected to the second throttle valve 19 through a wire.

Further, the outlet of the compressor 14 is further connected to the inlet of the third evaporator 17 through a second cut-off valve 24.

Further, a heat pump circulation working medium in the heat pump circulation system is the working medium capable of implementing a condensation temperature from 55° C. to 75° C. and an evaporation temperature from −5° C. to 35° C.

Further, the third evaporator 17 is an air source evaporator.

Further, the first throttle valve 18 and the second throttle valve 19 are externally balanced type thermal expansion valves or electronic expansion valves. When the first throttle valve 18 and the second throttle valve 19 are externally balanced type thermal expansion valves, the first temperature controller 21 and the second temperature controller 22 are temperature sensing bulbs of the thermal expansion valves correspondingly.

The steps of an operating method for the water treatment system of coupling the heat pump with the multi-effect evaporation in the present disclosure areas follows. When an aqueous solution to be treated exists, a first pressure reducing valve 4, a second pressure reducing valve 13, and a first cut-off valve 23 are opened. The aqueous solution to be treated enters a first centrifugal pump 1 for pressurization, then enters a first-effect evaporator 3 from a solution inlet b1 after preheating by a pre-heater 2. Vapor generated by heating the aqueous solution to be treated in the first-effect evaporator 3 flows into a second-effect evaporator 5 from a top outlet b5 of the first-effect evaporator 3 through a vapor inlet c3. The unevaporated water flows out of an outlet b2 of the first-effect evaporator 3 and depressurized by the first pressure reducing valve 4, then continuously enters the second-effect evaporator 5 for exchanging heat with the vapor flowing from the first-effect evaporator 3 and vapor generated by the evaporation is concentrated into a concentrated solution simultaneously and flows out from an outlet c2 of the second-effect evaporator 5. Condensed water obtained by heat-releasing and condensing the vapor flows into the pre-heater 2 for heat exchange from an outlet c4 of the second-effect evaporator 5. Secondary vapor generated in the second-effect evaporator 5 is introduced into a vapor inlet d1 of a generator 6 from a top outlet c5 for condensation, and released heat is used to evaporate dilute lithium bromide solution in the generator 6.

The dilute lithium bromide solution in the generator 6 simultaneously absorbs condensation heat of the secondary vapor generated from the second-effect evaporator 5 and refrigerant gas that is compressed by a compressor 14 flowing in from an inlet d4. Generated vapor enters a condenser 7 for condensation. Condensate water is pressurized by a second centrifugal pump 8 and then enters a first evaporator 9 for evaporating into water vapor, and then enters an absorber 10. The lithium bromide solution in the generator 6 is pumped into a solution heat exchanger 11 by a third centrifugal pump 12 for heat-absorption and temperature-rise, then sprayed into the absorber 10 for absorbing water vapor to obtain a high-temperature lithium bromide solution. The lithium bromide solution in the absorber 10 enters a heat exchange tube of the first-effect evaporator 3 to heat and evaporate the water or solution outside the pipeline, and continuously enters the solution heat exchanger 11 for exchanging heat with the lithium bromide solution after cooling, and enters the generator 6 via the second pressure reducing valve 13 for a subsequent circulation after temperature is reduced.

One path of the refrigerant gas compressed by the compressor 14 in a compressor heat pump circulation enters the generator 6 for heating and condensing to provide heat required for a regeneration of a dilute solution. Another path of the refrigerant gas enters the first evaporator 9 to provide heat required for a water evaporation. Condensed refrigerant liquid is converged and then divided into two paths again, one path of the refrigerant liquid enters the second evaporator 16 for evaporation after throttling and depressurizing by a first throttle valve 18, and another path of the refrigerant liquid enters a third evaporator 17 through the first cut-off valve 23 and a second throttle valve 19 for evaporation. The refrigerant gas flowing out of the second evaporator 16 is converged with the refrigerant gas flowing out of the third evaporator 17 after regulating by an evaporation pressure regulating valve 20, then enters a subsequent circulation after being compressed by the compressor 14.

Because the third evaporator 17 is an air source evaporator in winter, when a surface of the air source evaporator is frosted and requires to be defrosted, the second shut-off valve 24 is opened, and one part of the refrigerant gas generated by the compressor 14 enters the third evaporator 17 through the pipeline for hot-gas bypass defrosting.

Further, the first throttle valve 18 is controlled by a temperature of the first temperature controller 21, and an opening degree of the first throttle valve 18 is adjusted in direct proportion to a water temperature at the outlet i3 of the second evaporator 16.

Further, the second throttle valve 19 is controlled by a temperature of the second temperature controller 22, and an opening degree of the second throttle valve 19 is adjusted in direct proportion to a temperature at an inlet of the compressor 14.

Compared with the prior art, the technical solutions of the present disclosure have the following beneficial technical effects.

The vapor in the tail-end evaporator of the multi-effect evaporation circulation is introduced into the generator in the absorption-type heat pump to release heat and condense.

The dilute solution in an absorber of the absorption-type heat pump is introduced into the first-effect evaporator to be evaporated by the treated water. The lithium bromide absorption-type heat pump is capable of outputting the heat source above 100° C. and providing the heat for the multi-effect evaporation system. The compressor heat pump with stable performance recovers the condensation heat of the vapor in the absorption-type heat pump and utilizes the air source evaporator to absorb heat from the ambient air, and supplies the heat for the generator by the heat pump condenser, so that the evaporation treatment of sewage or wastewater can be implemented without requiring additional heat source. The joint use of the multi-effect evaporation circulation, lithium bromide absorption-type heat pump circulation and compression-type heat pump circulation can not only combine the advantages of vapor compression circulation and lithium bromide absorption heat pump circulation to obtain a larger temperature rise and a higher thermal performance, but also implement multiple evaporation and condensation by means that the multi-effect evaporation circulation utilizes the pressure differences of the evaporator to recover the latent heat of the vapor of its own system, which combines with the lithium bromide absorption heat pump circulation to heat and reuse for the secondary vapor generated by the final-stage evaporator of the multi-effect evaporation circulation, so that the energy consumption of the evaporation process can be reduced significantly, and the energy efficiency of the system is improved.

BRIEF DESCRIPTION OF THE DRAWINGS

FIG. 1 illustrates a schematic diagram of a water treatment system in the present disclosure.

DESCRIPTION OF THE EMBODIMENTS

In order to enable the above objectives, features and advantages of the present disclosure to be more visible and understandable, the present disclosure is further described below in combination with the accompanying drawings and the embodiments.

Provided is a water treatment system of coupling a heat pump with multi-effect evaporation. The system comprises a multi-effect evaporation circulation system, a lithium bromide absorption-type heat pump circulation system and a compression-type heat pump circulation system. The multi-effect evaporation circulation system includes a first centrifugal pump 1, a pre-heater 2, a first-effect evaporator 3, a first pressure reducing valve 4 and a second-effect evaporator 5. The water to be treated is connected to an inlet of the first centrifugal pump 1 through a pipeline. An outlet of the first centrifugal pump 1 is connected to an inlet a1 of the pre-heater 2 through a pipeline. An outlet a2 of the pre-heater 2 is connected to a solution inlet b1 of the first-effect evaporator 3 through a pipeline. A solution outlet b2 of the first-effect evaporator 3 is connected to a solution inlet c1 of the second-effect evaporator 5 through the first pressure reducing valve 4 and is discharged from a concentrated solution outlet c2. A vapor outlet b5 of the first-effect evaporator 3 is connected to a vapor inlet c3 of the second-effect evaporator 5 through a pipeline. A condensed water outlet c4 of the second-effect evaporator 5 is connected to a condensed water inlet a3 of the pre-heater 2 through a pipeline and is discharged from an outlet a4.

The lithium bromide absorption-type heat pump circulation system includes a generator 6, a condenser 7, a second centrifugal pump 8, a first evaporator 9, an absorber 10, a solution heat exchanger 11, a third centrifugal pump 12 and a second pressure reducing valve 13. A vapor inlet d1 of the generator 6 is connected to a vapor outlet c5 of the second-effect evaporator 5 through a pipeline. Condensed water of the generator 6 is discharged from an outlet d2. An upper vapor outlet d6 of the generator 6 is connected to a vapor inlet e1 of the condenser 7. An outlet e2 of the condenser 7 is connected to a water inlet f1 of the first evaporator 9 through pipelines via the second centrifugal pump 8. A vapor outlet f2 of the first evaporator 9 is connected to a top vapor inlet g1 of the absorber 10. A bottom concentrated solution outlet d7 of the generator 6 is connected to an inlet h3 of the solution heat exchanger 11 via the third centrifugal pump 12. An outlet h4 of the solution heat exchanger 11 is connected to a solution inlet g2 of the absorber 10. A solution inlet h1 of the solution heat exchanger 11 is connected to a solution outlet b4 of the first-effect evaporator 3 through a pipeline. A solution outlet h2 of the solution heat exchanger 11 is connected to a solution inlet d5 of the generator 6 via the second pressure reducing valve 13, and a dilute solution outlet g3 of the absorber 10 is connected to an inlet b3 of the first-effect evaporator 3.

The compression-type heat pump circulation system includes a compressor 14, a fourth centrifugal pump 15, a second evaporator 16, a third evaporator 17, a first throttle valve 18, a second throttle valve 19 and an evaporation pressure regulating valve 20. An outlet of the compressor 14 is connected to a refrigerant inlet d4 of the generator 6 and a refrigerant inlet f3 of the first evaporator 9 respectively. A refrigerant outlet d3 of the generator 6 and a refrigerant outlet f4 of the first evaporator 9 are converged by pipelines, then connected to an inlet of a first cut-off valve 23 and an inlet of the first throttle valve 18 respectively. An outlet of the first throttle valve 18 is connected to a solution inlet i1 of the second evaporator 16. A solution outlet i2 of the second evaporator 16 is connected to an inlet of the evaporation pressure regulating valve 20. An outlet of the first cut-off valve 23 is connected to an inlet of the second throttle valve 19 through a pipeline. An outlet of the second throttle valve 19 is connected to an inlet of the third evaporator 17. An outlet of the third evaporator 17 and an outlet of the evaporation pressure regulating valve 20 are jointly connected to the compressor 14 through pipelines. An outlet of the fourth centrifugal pump 15 is connected to an outlet e3 of the condenser 7. An outlet e4 of the condenser 7 is connected to an inlet i4 of the second evaporator 16 and an outlet i3 of the second evaporator 16 is connected to an inlet of the fourth centrifugal pump 15.

A first temperature controller 21 is disposed on a pipeline at the outlet i3 of the second evaporator 16. A control signal of the first temperature controller 21 is connected to the first throttle valve 18 through a wire. A second temperature controller 22 is disposed at the inlet of the compressor 14, and a control signal of the second temperature controller 22 is connected to the second throttle valve 19 through a wire.

The outlet of the compressor 14 is further connected to the inlet of the third evaporator 17 through a second cut-off valve 24.

A heat pump circulation working medium in the heat pump circulation system is the working medium capable of implementing a condensation temperature from 55° C. to 75° C. and an evaporation temperature from −5° C. to 35° C.

The third evaporator 17 is an air source evaporator.

The first throttle valve 18 and the second throttle valve 19 are externally balanced type thermal expansion valves or electronic expansion valves. When the first throttle valve 18 and the second throttle valve 19 are externally balanced type thermal expansion valves, the first temperature controller 21 and the second temperature controller 22 are temperature sensing bulbs of the thermal expansion valves correspondingly.

Provided is an operating method for the water treatment system of coupling the heat pump with the multi-effect evaporation. When an aqueous solution to be treated exists, a first pressure reducing valve 4, a second pressure reducing valve 13, and a first cut-off valve 23 are opened. The aqueous solution to be treated enters a first centrifugal pump 1 for pressurization, then enters a first-effect evaporator 3 from a solution inlet b1 after preheating by a pre-heater 2. Vapor generated by heating the aqueous solution to be treated in the first-effect evaporator 3 flows into a second-effect evaporator 5 from a top outlet b5 of the first-effect evaporator 3 through a vapor inlet c3. The unevaporated water flows out of an outlet b2 of the first-effect evaporator 3 and depressurized by the first pressure reducing valve 4, then continuously enters the second-effect evaporator 5 for exchanging heat with the vapor flowing from the first-effect evaporator 3 and vapor generated by the evaporation is concentrated into a concentrated solution simultaneously and flows out from an outlet c2 of the second-effect evaporator 5. Condensed water obtained by heat-releasing and condensing the vapor flows into the pre-heater 2 for heat exchange from an outlet c4 of the second-effect evaporator 5. Secondary vapor generated in the second-effect evaporator 5 is introduced into a vapor inlet d1 of a generator 6 from a top outlet c5 for condensation, and released heat is used to evaporate dilute lithium bromide solution in the generator 6.

The dilute lithium bromide solution in the generator 6 simultaneously absorbs condensation heat of the secondary vapor generated from the second-effect evaporator 5 and refrigerant gas that is compressed by a compressor 14 flowing in from an inlet d4. Generated vapor enters a condenser 7 for condensation. Condensate water is pressurized by a second centrifugal pump 8 and then enters a first evaporator 9 for evaporating into water vapor, and then enters an absorber 10. The lithium bromide solution in the generator 6 is pumped into a solution heat exchanger 11 by a third centrifugal pump 12 for heat-absorption and temperature-rise, then sprayed into the absorber 10 for absorbing water vapor to obtain a high-temperature lithium bromide solution. The lithium bromide solution in the absorber 10 enters a heat exchange tube of the first-effect evaporator 3 to heat and evaporate the water or solution outside the pipeline, and continuously enters the solution heat exchanger 11 for exchanging heat with the lithium bromide solution after cooling, and enters the generator 6 via the second pressure reducing valve 13 for a subsequent circulation after temperature is reduced.

One path of the refrigerant gas compressed by the compressor 14 in a compressor heat pump circulation enters the generator 6 for heating and condensing to provide heat required for a regeneration of a dilute solution. Another path of the refrigerant gas enters the first evaporator 9 to provide heat required for a water evaporation. Condensed refrigerant liquid is converged and then divided into two paths again, one path of the refrigerant liquid enters the second evaporator 16 for evaporation after throttling and depressurizing by a first throttle valve 18, and another path of the refrigerant liquid enters a third evaporator 17 through the first cut-off valve 23 and a second throttle valve 19 for evaporation. The refrigerant gas flowing out of the second evaporator 16 is converged with the refrigerant gas flowing out of the third evaporator 17 after regulating by an evaporation pressure regulating valve 20, then enters a subsequent circulation after being compressed by the compressor 14.

Because the third evaporator 17 is an air source evaporator in winter, when a surface of the air source evaporator is frosted and requires to be defrosted, the second shut-off valve 24 is opened, and one part of the refrigerant gas generated by the compressor 14 enters the third evaporator 17 through the pipeline for hot-gas bypass defrosting.

The first throttle valve 18 is controlled by a temperature of the first temperature controller 21, and an opening degree of the first throttle valve 18 is adjusted in direct proportion to a water temperature at the outlet i3 of the second evaporator 16. The controlling of the water temperature is mainly aimed at ensuring the operating requirements of the condenser 7 and enabling the vapor in the condenser 7 to be completely liquefied. When the water temperature at the outlet i3 of the seconder generator 16 is too high, which indicates that the cooling capacity of the second evaporator 16 is insufficient, at this time, the valve opening degree of the first throttle valve 18 is increased, and the flow rate of the refrigerant is increased.

The second throttle valve 19 is controlled by a temperature of the second temperature controller 22, and an opening degree of the second throttle valve 19 is adjusted in direct proportion to a temperature at an inlet of the compressor 14. The temperature is the suction temperature of the compressor, which is aimed at stabilizing the operation condition of the compressor. Since the temperature and the pressure of the refrigerant at the outlet of the second evaporator 16 are mainly controlled and regulated by the first temperature controller 21, the suction temperature of the compressor 14 is mainly regulated by the third evaporator 17. When the suction temperature of the compressor 14 is too high, the valve opening degree of the second throttle valve 19 can be increased, and the flow rate of the refrigerant is increased.

Although the present disclosure is disclosed as above, the present disclosure is not limited thereto. Any person skilled in the art can make various changes and modifications without departing from the spirit and scope of the present disclosure. Therefore, the protection scope of the present disclosure should be subject to the scope defined in the claims.

What is claimed is:

1. A water treatment system of coupling a heat pump with multi-effect evaporation, comprising a multi-effect evaporation circulation system, a lithium bromide absorption-type heat pump circulation system and a compression-type heat pump circulation system, wherein the multi-effect evaporation circulation system includes a first centrifugal pump (1), a pre-heater (2), a first-effect evaporator (3), a first pressure reducing valve (4), and a second-effect evaporator (5); water to be treated is connected to an inlet of the first centrifugal pump (1) through a pipeline, an outlet of the first centrifugal pump (1) is connected to an inlet (a1) of the pre-heater (2) through a pipeline, an outlet (a2) of the pre-heater (2) is connected to a solution inlet (b1) of the first-effect evaporator (3) through a pipeline, a solution outlet (b2) of the first-effect evaporator (3) is connected to a solution inlet (c1) of the second-effect evaporator (5) through the first pressure reducing valve (4), and a concentrated solution in the second-effect evaporator (5) is discharged from a concentrated solution outlet (c2), a vapor outlet (b5) of the first-effect evaporator (3) is connected to a vapor inlet (c3) of the second-effect evaporator (5) through a pipeline, and a condensed water outlet (c4) of the second-effect evaporator (5) is connected to a condensed water inlet (a3) of the pre-heater (2) through a pipeline, and a condensed water in the pre-heater (2) is discharged from an outlet (a4);

the lithium bromide absorption-type heat pump circulation system includes a generator (6), a condenser (7), a second centrifugal pump (8), a first evaporator (9), an absorber (10), a solution heat exchanger (11), a third centrifugal pump (12), and a second pressure reducing valve (13), a vapor inlet (d1) of the generator (6) is connected to a vapor outlet (c5) of the second-effect evaporator (5) through a pipeline, a condensed water of the generator (6) is discharged from an outlet (d2), an upper vapor outlet (d6) of the generator (6) is connected to a vapor inlet (e1) of the condenser (7), an outlet (e2) of the condenser (7) is connected to a water inlet (f1) of the first evaporator (9) through pipelines via the second centrifugal pump (8), a vapor outlet (f2) of the first evaporator (9) is connected to a top vapor inlet (g1) of the absorber (10), a bottom concentrated solution outlet (d7) of the generator (6) is connected to an inlet (h3) of the solution heat exchanger (11) via the third centrifugal pump (12), an outlet (h4) of the solution heat exchanger (11) is connected to a solution inlet (g2) of the absorber (10), a solution inlet (h1) of the solution heat exchanger (11) is connected to a solution outlet (b4) of the first-effect evaporator (3) through a pipeline, a solution outlet (h2) of the solution heat exchanger (11) is connected to a solution inlet (d5) of the generator (6) via the second pressure reducing valve (13), and a dilute solution outlet (g3) of the absorber (10) is connected to an inlet (b3) of the first-effect evaporator (3); and the compression-type heat pump circulation system includes a compressor (14), a fourth centrifugal pump (15), a second evaporator (16), a third evaporator (17), a first throttle valve (18), a second throttle valve (19), and an evaporation pressure regulating valve (20), an outlet of the compressor (14) is connected to both a refrigerant inlet (d4) of the generator (6) and a refrigerant inlet (f3) of the first evaporator (9), a refrigerant outlet (d3) of the generator (6) and a refrigerant outlet (f4) of the first evaporator (9) are converged by pipelines, and then connected to both an inlet of a first cut-off valve (23) and an inlet of the first throttle valve (18), an outlet of the first throttle valve (18) is connected to a solution inlet (i1) of the second evaporator (16), a solution outlet (i2) of the second evaporator (16) is connected to an inlet of the evaporation pressure regulating valve (20), an outlet of the first cut-off valve (23) is connected to an inlet of the second throttle valve (19) through a pipeline, an outlet of the second throttle valve (19) is connected to an inlet of the third evaporator (17), an outlet of the third evaporator (17) and an outlet of the evaporation pressure regulating valve (20) are jointly connected to the compressor (14) through pipelines, an outlet of the fourth centrifugal pump (15) is connected to an outlet (e3) of the condenser (7), an outlet (e4) of the condenser (7) is connected to an inlet (i4) of the second evaporator (16), and an outlet (i3) of the second evaporator (16) is connected to an inlet of the fourth centrifugal pump (15).

2. The water treatment system of coupling the heat pump with the multi-effect evaporation according to claim 1, wherein a first temperature controller (21) is disposed on a pipeline at the outlet (i3) of the second evaporator (16), a control signal of the first temperature controller (21) is connected to the first throttle valve (18) through a wire, a second temperature controller (22) is disposed at the inlet of the compressor (14), and a control signal of the second temperature controller (22) is connected to the second throttle valve (19) through a wire.

3. The water treatment system of coupling the heat pump with the multi-effect evaporation according to claim 2, wherein an outlet of the compressor (14) is further connected to the inlet of the third evaporator (17) through a second cut-off valve (24).

4. The water treatment system of coupling the heat pump with the multi-effect evaporation according to claim 2, wherein a heat pump circulation working medium in the compression-type heat pump circulation system is a working medium for implementing a condensation temperature from 55° C. to 75° C. and an evaporation temperature from −5° C. to 35° C.

5. The water treatment system of coupling the heat pump with the multi-effect evaporation according to claim 2, wherein the third evaporator (17) is an air source evaporator.

6. The water treatment system of coupling the heat pump with the multi-effect evaporation according to claim 2, wherein the first throttle valve (18) and the second throttle valve (19) are externally balanced type thermal expansion valves or electronic expansion valves, when the first throttle valve (18) and the second throttle valve (19) are the externally balanced type thermal expansion valves, the first temperature controller (21) and the second temperature controller (22) are temperature sensing bulbs of thermal expansion valves correspondingly.

7. An operating method for the water treatment system of coupling the heat pump with the multi-effect evaporation according to claim 2, comprising:

providing an aqueous solution to be treated; and opening the first pressure reducing valve (4), the second pressure reducing valve (13), and the first cut-off valve (23), wherein the aqueous solution to be treated enters the first centrifugal pump (1) for pressurizing, then enters the first-effect evaporator (3) from the solution inlet (b1) after preheating by the pre-heater (2), vapor generated by heating the aqueous solution to be treated in the first-effect evaporator (3) flows into the second-effect evaporator (5) from the top outlet (b5) of the first-effect evaporator (3) through the vapor inlet (c3), the unevaporated water flows out of the outlet (b2) of the first-effect evaporator (3), depressurized by the first pressure reducing valve (4), and then continuously enters the second-effect evaporator (5) for exchanging heat with a vapor flowing in from the first-effect evaporator (3), and a vapor generated by an evaporation is concentrated into a concentrated solution simultaneously and flows out of the outlet (c2) of the second-effect evaporator (5), a condensed water obtained by performing heat-releasing and condensing on a vapor flows into the pre-heater (2) from the outlet (c4) of the second-effect evaporator (5) for heat exchange, a secondary vapor generated in the second-effect evaporator (5) is introduced into the vapor inlet (d1) of the generator (6) from the top outlet (c5) for condensation, and a released heat is used to evaporate a dilute lithium bromide solution in the generator (6);

the dilute lithium bromide solution in the generator (6) simultaneously absorbs both the secondary vapor generated from the second-effect evaporator (5) and a condensation heat of a refrigerant gas compressed by a compressor 14 flowing in from the inlet (d4), a generated vapor enters the condenser (7) for condensation, and a condensed water enters a first evaporator (9) for evaporating into a water vapor after being pressurized by the second centrifugal pump (8), and then the water vapor enters the absorber (10), a lithium bromide solution in the generator (6) is pumped into the solution heat exchanger (11) by the third centrifugal pump (12) for heat-absorption and temperature-rise, then sprayed into the absorber (10) for absorbing a water vapor to obtain a high-temperature lithium bromide solution, a lithium bromide solution in the absorber (10) enters a heat exchange tube of the first-effect evaporator (3) to heat and evaporate a water or solution outside the heat exchange tube, and continuously enters the solution heat exchanger (11) after cooling for exchanging heat with the lithium bromide solution, and enters the generator (6) via the second pressure reducing valve (13) after temperature is reduced for a subsequent circulation;

one path of the refrigerant gas compressed by the compressor (14) in a compressor heat pump circulation enters the generator (6) for heating and condensing to provide heat required for a regeneration of a dilute solution, another path of the refrigerant gas enters the first evaporator (9) to provide heat required for a water evaporation, a condensed refrigerant liquid is converged and then divided into two paths again, one path of the refrigerant liquid enters the second evaporator (16) for evaporation after throttling and depressurizing by the a first throttle valve (18), and another path of the refrigerant liquid enters the third evaporator (17) through the first cut-off valve (23) and the second throttle valve (19) for evaporation, a refrigerant gas flowing out of the second evaporator (16) is regulated by the evaporation pressure regulating valve (20), and then is converged with a refrigerant gas flowing out of the third evaporator (17), and then enters a subsequent circulation after being compressed by the compressor (14);

wherein the third evaporator (17) is an air source evaporator, and during winter the operating method further comprises:

when a surface of the air source evaporator is frosted and requires to be defrosted, opening the second shut-off valve (24), and one part of the refrigerant gas generated by the compressor (14) enters the third evaporator (17) through a pipeline for hot-gas bypass defrosting.

8. The operating method for the water treatment system of coupling the heat pump with the multi-effect evaporation according to claim 7, wherein the first throttle valve (18) is controlled by a temperature of the first temperature controller (21), and an opening degree of the first throttle valve (18) is adjusted in direct proportion to a water temperature at the outlet (i3) of the second evaporator (16).

9. The operating method for the water treatment system of coupling the heat pump with the multi-effect evaporation according to claim 7, wherein the second throttle valve (19) is controlled by a temperature of the second temperature controller (22), and an opening degree of the second throttle valve (19) is adjusted in direct proportion to a temperature at an inlet of the compressor (14).

* * * * *